United States Patent

Lorenz

[11] Patent Number: 5,463,861
[45] Date of Patent: Nov. 7, 1995

[54] FRICTION FALSE TWIST UNIT

[75] Inventor: Hellmut Lorenz, Remscheid, Germany

[73] Assignee: Barmag AG, Remscheid, Germany

[21] Appl. No.: 98,374

[22] PCT Filed: Dec. 9, 1992

[86] PCT No.: PCT/DE92/01024

§ 371 Date: Aug. 9, 1993

§ 102(e) Date: Aug. 9, 1993

[87] PCT Pub. No.: WO93/12280

PCT Pub. Date: Jun. 24, 1993

[30] Foreign Application Priority Data

Dec. 12, 1991 [DE] Germany .......................... 41 40 903.5
Mar. 25, 1992 [DE] Germany .......................... 42 09 587.5
May 13, 1992 [DE] Germany .......................... 42 15 762.5

[51] Int. Cl.⁶ .................................................. D01H 7/92
[52] U.S. Cl. ............................ 57/339; 57/135; 384/504; 384/517; 384/536
[58] Field of Search ............................ 57/337, 338, 339, 57/340, 134, 135; 384/535, 536, 504, 517

[56] References Cited

U.S. PATENT DOCUMENTS

| 3,438,191 | 4/1969 | Kuznetsov et al. ........................ 57/135 |
| 3,813,868 | 6/1974 | Lorenz .................................. 57/339 X |
| 4,489,546 | 12/1984 | Schuster et al. . |
| 4,896,239 | 1/1990 | Ghose .................................. 384/536 X |

FOREIGN PATENT DOCUMENTS

| 1366436 | 12/1964 | France ..................................... 57/135 |
| 2375360 | 7/1978 | France . |
| 1264306 | 3/1968 | Germany ................................. 57/135 |
| 2936845 | 4/1981 | Germany . |
| 2936791 | 4/1981 | Germany . |
| 4018958 | 12/1990 | Germany ................................. 57/135 |
| 2058157 | 4/1981 | United Kingdom . |
| 2120286 | 11/1983 | United Kingdom . |

Primary Examiner—Joseph J. Hail, III
Attorney, Agent, or Firm—Bell, Seltzer, Park & Gibson

[57] ABSTRACT

The invention relates to a friction false twist unit for crimping synthetic filament yarns, the friction element shafts of which are movable with a radial play, and which are influenced in their movement by friction dampers.

5 Claims, 10 Drawing Sheets

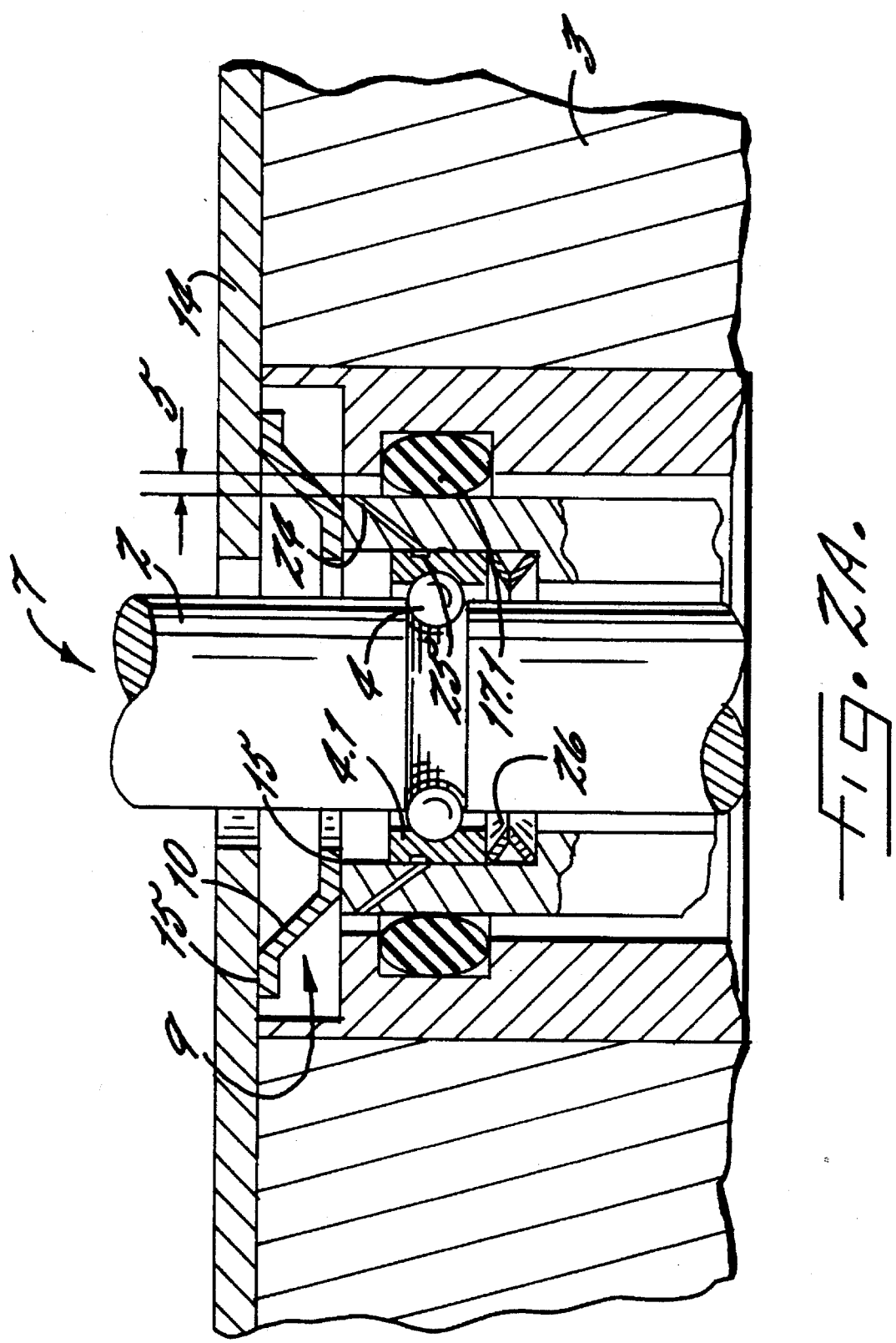

FRICTION FALSE TWIST UNIT

BACKGROUND OF THE INVENTION

The present invention relates to an apparatus for friction false twisting an advancing yarn, of the type having a yarn twisting assembly composed of at least three spindles mounted for rotation about parallel axes. More particularly, the present invention relates to a novel mounting structure for the spindles of such an assembly.

Such a friction false twist unit is known, for example, from DE OS 29 36 791. In this known friction false twist unit, the driven shafts, also described as friction element spindles, are supported at their one end with a radial play in a stationary mounting support or bedplate of the friction false twist unit, whereas at their other end they are arranged radially fixed in the bedplate.

Within the radial play, the friction element shaft is flexibly supported and suspended in a certain manner for damped movement.

In the known embodiment this is accomplished in that the nonrotating bearing parts which are the outer rings or races of the antifriction bearings, are supported relative to the stationary mounting support through an interposed rubber ring, which permits on the one hand a certain radial mobility of the driven shaft, and on the other has a function as a damping element, in that the rubber ring is squeezed in accordance with the deflection of the flexible bearing.

The friction unit is intended for an operation low in vibrations, and resonant vibrations are to be avoided.

This requirement is also met in the case of the friction unit which is known from DE OS 29 36 845. In this known friction unit, the friction element shafts are likewise supported with a radial play relative to the stationary mounting support in rubber rings, which exhibit damping properties.

These rubber rings are practice-proven, since they are reliable and wear-resistant, and moreover ensure a simple assembly of the friction false twist units.

When assembling the known friction false twist units, it is necessary to insert the rubber rings, together with the bearings, into the bores receiving the bearings in axial longitudinal direction of the shafts while radially compressing them.

However, the possibilities of installing the rubber rings are limited, since it is not possible to either compress them to any desired extent or insert them into the receiving bores in any desired oversize.

Accordingly, the very good damping properties of the known friction false twist units cannot be further improved without adversely affecting their assembly.

However, the development of these friction false twist units attempts to reach increasingly higher rotational speeds, so that vibrational problems arise therefrom in particular, when the friction element shafts pass through critical speeds.

In particular the passage through critical speeds requires with respect to the improved development of the friction false twist units an improved damping which is technically simple to realize.

In so doing, it should also be considered that the friction false twist units are equipped to an increasing extent with longer shafts and larger masses, so that a higher residual unbalance results which can practically not be balanced.

It is therefore the object of the present invention to further improve the known friction false twist unit such that its vibrational behavior is damped to a greater extent than before, and that yet its assembly is further simplified.

Radial deflections of the shaft are to remain small up to high rotational speeds (at least 20,000 rpm), in spite of the facts that a floating bearing is used, that the shafts are longer and equipped with larger masses than before, that the shafts and the friction disks arranged thereon cannot be prevented from having a residual unbalance, for example as a result of uneven wear, which can practically not be balanced, and that the shaft diameters are small. What matters in particular is that the axial position of the shaft relative to the housing should not change.

SUMMARY OF THE INVENTION

The above and other objects and advantages of the present invention are achieved by the provision of a false twisting apparatus which comprises a mounting bedplate, and a yarn twisting assembly comprising at least three spindles which are mounted to the bedplate for rotation about fixed, parallel axes which are positioned at the corner points of an equilateral polygon having a number of sides corresponding to the number of spindles. A plurality of circular disks are mounted on each spindle for rotation therewith and with the disks of the spindles overlapping at a point centrally between the spindles and defining an operative yarn path of travel extending axially therebetween. The apparatus also includes means for concurrently rotating each of the spindles.

In accordance with the present invention, each of the spindles is mounted in a bore in the bedplate, and at least two bearings are mounted in the bore in an axially spaced apart arrangement between the bore and the associated spindle. At least one of the bearings includes a non-rotating outer ring which includes a contact surface which is perpendicular to the axis of the associated spindle and an outer peripheral surface which is coaxial with the axis of the associated spindle. A resilient radial damping ring is disposed circumferentially between the outer surface of the outer ring and the bore in the bedplate, and friction damping means is mounted to the bedplate so as to frictionally engage the contact surface of the outer ring and thereby dampen radial movement of the spindle during operation of the apparatus.

From the invention the advantage results that the damping properties can be varied over wide ranges, without increasing constructional expenditure. The solution is characterized in particular in that, although a so-called "flexible" bearing is present, the usual disadvantage of the flexible bearing is avoided in that the axis of rotation of the shaft readjusts itself in any operation and at any change in the operating condition (rotational speed). Rather, with the present invention, during the initial operation, each shaft seeks for itself automatically its axis of rotation which does then no longer change.

This is accomplished in that the radial movement of the shafts, also described as friction element spindles, is transmitted to the friction dampers, and that to establish the damping properties, it is only necessary to design the friction damper accordingly.

Consequently, it is necessary to arrange the friction dampers such that they engage in those regions of the nonrotating bearing parts, which perform a relative movement with respect to the stationary mounting support. They are the outer rings or races of the antifriction bearings of the friction element shafts. Supported on same are the friction dampers, the latter extending between the housing and the outer ring.

It is of importance that one end of the friction element shaft be axially and radially fixed, and that the other end be axially fixed and radially movable. This end is hereafter described as the free end.

It is furthermore of importance that the friction element shafts be supported for floating movement. Accordingly, the head of each friction element shaft is freely movable in radial direction and therefore performs deflections. These deflections are excited by periodical vibrations which need to be considerably damped, in particular when passing through critical speeds, so that the friction elements are not destroyed.

Still further, it is of importance that the friction element shafts be fixed absolutely rigidly in axial direction. This is accomplished by a stop, against which the bearing of the friction element shaft is supported.

In this arrangement, it matters that not only the installation is axially fixed, but that also the axial position of the shafts relative to one another is accurate up to few one hundredths of a millimeter, so as to avoid a contacting of the friction disks, and thus damage to the yarn. The axial biasing may occur in force-locking manner by spring elements, for example, metal springs or rings. The axial biasing of both bearings, however, may also be generated in that the outer ring of the one bearing is secured in its bush under an initial stress, for example glued or connected in any other manner. Finally, it is possible to bias the bearings in that from the beginning the ball tracks of the two bearings are introduced relative to one another into a common outer ring such that the bearings are biased relative to one another.

For the invention the mounting support of the shafts is of special importance.

This mounting support consists of a fixed bearing and a loose bearing, which meet with the following properties:

As regards the fixed bearing, the outer ring is secured substantially axially relative to the housing. The shaft is likewise secured substantially axially relative to the outer ring. The locking is operative in axial direction. The axial locking may occur, for example, by a mutual biasing of the two antifriction bearings.

It may be useful to make the bearing flexible in the radial direction. In accordance with the invention, this measure allows to influence the vibrational behavior without the shaft being able to move in axial direction.

The axial locking serves to prevent a contacting of the friction disks which form between each other a small spacing for the advance of the synthetic yarn to be crimped.

The radially flexible bearing is not absolutely necessary, but may additionally be needed so as to be able to influence the vibrational behavior in a damping manner.

In comparison therewith, in a loose bearing the shaft is axially secured relative to the outer ring, whereas the outer ring is axially movable relative to the housing. As a result, the outer ring of the loose bearing is damped in radial direction under the influence of external contact pressures of the friction damper, while an accurately defined axial bearing positioning is obtained for the shaft at the same time.

Since the shaft is likewise secured in axial direction relative to the outer ring, the latter is axially movable relative to the housing, so as to avoid locked-up stress, for example, by thermal expansion, in such a manner that the shaft clearly secured in axial direction is unable to evade uncontrolled movement in the axial direction.

This kind of bearing is realized in accordance with the invention when the bearing, while axially secured, enables as a whole in addition a shaft suspension flexibly movable in radial direction.

As has been recognized by the invention, this measure allows to enable an influencing of the vibrational behavior with a flexible and damped radial movement.

More extensive embodiments avail themselves of a bearing, in which two individual antifriction bearings are braced against one another, one of the antifriction bearing being the fixed bearing and the other the loose bearing.

As a result of the axial biasing, axially uncontrolled movements of the friction element shafts are excluded. Therefore, it is avoided with certainty that the individual friction elements collide with one another and are damaged.

The invention makes use of the recognition that the radial vibrations of the shafts of a friction unit which arise from unbalance and are actuated periodically, can be damped by friction dampers which are secured by external contact pressures.

The radial movements of the friction element shafts are thus transmitted by external contact pressures to the friction dampers and influenced by the friction dampers such that an amplitude increase of vibrations of the system is avoided.

Basically, damping elements with a path-dependent restoring force, such as for example radially biased O-rings, are considered as friction dampers. In this case, the restoring force is dependent on the deflection or on the deflection-dependent deformation of the damping element.

Alternatively or additionally, also damping elements are used, which generate a path-independent frictional force. In this case, the damping elements are biased by a normal force in axial direction, whereby the damping effect is dependent on the amount of the normal force and the coefficient of friction between the damping element and contact surface.

Special attention is attributed in particular to the last-mentioned further development of the invention, since the damping effect may be predetermined via the amount of the normal force.

Thus, for example, it may be provided that the normal force is predetermined so high that only during a first acceleration of the friction unit a one-time breakaway of the damping element with a path-independent frictional force occurs, whereby the friction element shaft centers itself.

The present invention recognizes that the friction element shaft operating under unbalance attempts to center itself at the initial startup. The forces of unbalance occurring in this instance are so great that the forces of static friction between the friction dampers and the housing are overcome. In so doing, the assembled position of the antifriction bearings breaks away, and the shaft shifts to its self-centered position, until the forces of unbalance are no longer capable of overcoming the forces of sliding friction. Then, the shaft operates in its self-centered position and remains in same, since it is now again held by the forces of static friction. In this position, the shaft is figuratively frozen, with the frozen position inducing the slightest vibrational excitations.

It is therefore suggested that the friction dampers be adjusted such that the axial, external contact pressures are overcome only when the forces of unbalance engaging on the shafts as a result of unbalances exceed the value which is necessary to overcome the static friction between the friction damper and the front surface of the outer ring. This will be relevant in the range of dangerous resonant vibrations, when the friction element shafts pass through their critical speeds.

This further development of the invention also has the advantage of a very stiff damping. Consequently, the damping forces are very high and the deflections very small.

Additionally, the friction dampers of the present invention offer the advantage that they act statically in the range of the operating speeds. In this speed range, the friction element shaft rotates overcritically.

It is a further characteristic of the invention that the axial locking of the friction element shafts effects a harder mounting support. As a result, the vibrational energy of the shafts can be received and damped only by a single rubber ring. This rubber ring is arranged facing the free shaft end and causes by its squeezing a damping of the shaft. However, since contrary to previous solutions only a single rubber ring is present, it is necessary that the friction damper of the present invention absorb and destroy the excess of vibrational energy.

The loose bearing preferably is nearest the free end of the shaft, i.e. nearest the disks on the associated shaft, which provides an advantage in that the introduction of torque of the drive into the shafts occurs at the fixed end, and that the assembly of the friction unit is adapted to the drive without influence on the axial locking of the shafts.

The contact pressure against the outer ring of the loose bearing is preferably operative in the sense of an axial clamping of the loose bearing against the fixed bearing. This offers the advantage that the axial, external contact pressures do not only introduce the radial movement of the shaft into the friction damper, but moreover also assume the axial bracing of the two antifriction bearings. In so doing, the amount of the axial biasing force is to be selected such that the friction damper fits tightly on the front surface of the outer ring of the loose bearing.

It may here be useful that the respective contact pressure required to damp the radial movement of the friction element shafts is adjusted via the axial biasing force, so that the required labor of assembling can be further reduced. In this case it is recommended that the friction dampers be arranged such that on the one hand they support themselves on the housing, and that on the other hand they support themselves on annular steps or annular offsets, which are directly formed by the outer rings. The direct connection between the outer rings and the friction dampers allows to accomplish that the variance of the vibratory system, which forms the friction false twist unit, is minimized. This also allows to reduce the complex vibrational behavior to a low number of influential parameters.

The friction dampers may take the form of annular cup springs which are supported between the outer rings of the loose bearings and the bedplate. This provides the advantage that standardized components are used as friction dampers. This further development of the invention avails itself of the recognition that the radial movement of the friction element shafts is only small, and that the supporting forces of the cup springs can easily be absorbed by their inner or outer edges, and the force is transmitted on the contact points between the inner or outer edge of the cup springs and the outer ring or housing.

In so doing, the necessary force of static friction which transmits the radial vibrational movement of the rotating shafts to the friction dampers, is generated via the supporting forces.

The initial biasing forces which are applied by means of the cup springs, can be adapted over wide ranges to the respective case of application, since the characteristic curves of the cup springs can be influenced by parallel or serial arrangement. Furthermore, a plurality of cup springs with identical dimensions, but different spring stiffnesses is available, so that it is possible to appropriately select each time the optimal cup spring for each application.

It is known, though, from DE OS 29 36 845 to mutually brace the bearings of a friction element shaft by means of cup springs. However, this case of application differs substantially from the invention in that the cup spring in the known construction serves to prestress the bearing only axially. Furthermore, the cup spring is installed at the end of the friction element shaft which is firmly secured in radial direction.

In the case of the invention, however, it matters that the free end of the friction element shaft may move radially, since only this allows the action of the forces of static friction to come to bear. These frictional forces cause a deformation of the cup spring in radial direction. In particular, cup springs permit a deformation with a great damping portion to occur in radial direction, which is used by the present invention.

The outer rings of the fixed bearings may be secured relative to the bedplate by axially biased rubber rings, which are clamped between the outer rings and the bedplate. Thus the fixed shaft end is secured in position by means of a rubber ring. The amount of the clamping force results from the respective contact pressure, at which the rubber ring is axially compressed. To this end, a cup spring is used in particular in addition to the rubber ring, which biases the rubber ring against a stepped diameter or collar of the outer ring of the antifriction bearing. The cooperation of rubber ring and cup spring allows on the one hand to make use of the punctual flexibility of the rubber ring, whereas the amount of the axial clamping force is defined by the cup spring. In so proceeding, it should be noted the axial clamping force is so great that the clamped outer ring of the bearing is unable to lift against the force of the cup spring.

The further development of the invention offers the advantage of simplest manufacture and assembly. In this embodiment the outer ring is axially secured, for example, by a clamping ring which holds the outer ring against the pressure plate.

In a further embodiment of the invention, the outer rings of the fixed bearings may be clamped between a pressure plate and a counter pressure plate of the bedplate. This embodiment offers a simple possibility of axially bracing two individual antifriction bearings. To this end, the outer ring at the free end of the shaft is initially accommodated for sliding movement in the outer ring of the antifriction bearing at the fixed end of the shaft. It is then held, for example by a cup spring, relative to the outer ring of the fixed shaft end under an axial bias, and secured in this position, as is described with reference to an embodiment.

The friction dampers of the present invention are preferably operative substantially in the region of the free ends of the shafts. This provides the advantage that a favorable force introduction point for the static friction forces is made available, so that high damping effects are obtained by means of relatively little contact pressures. In this instance, the effective damping force of the friction damper acts upon the shaft as a moment, with the length of the lever arm between the force introduction point into the shaft and the fixed bearing assuming its greatest possible value.

The shafts may be flexibly supported in the bore of the bedplate by means of annular radial rubber dampers, such that the rubber dampers are compressed upon a radial movement of the shaft. This feature recognizes that the annular rubber dampers can assist in centering the friction element shafts.

Such annular rubber dampers, as is known, are able to assist a fast rotating, vertically oriented shaft in its attempt to self-center.

It should explicitly be noted that this advantage is not limited only to dampers which consist of rubber, but basically the dampers may also consist of any comparable elastomer.

The antifriction bearings of each shaft may be biased in the axial direction toward each other, so as to eliminate play. This permits the shaft deflections to be transmitted entirely free of play to the outer rings of the bearing, and to thus damp same already at their formation.

BRIEF DESCRIPTION OF THE DRAWINGS

Some of the objects and advantages of the present invention having been stated, others will appear as the description proceeds, when taken in conjunction with the accompanying drawings, in which:

FIG. 2a shows a detail view of the embodiment of FIG. 2 to illustrate the bearing at the free shaft end;

FIG. 4 illustrates an embodiment of the friction dampers in accordance with the invention installed on a friction element shaft;

DETAILED DESCRIPTION OF THE PREFERRED EMBODIMENTS

Unless specified otherwise in the following, the description will always apply to all FIGS. 1–4 and 6a–b.

Figure 3:
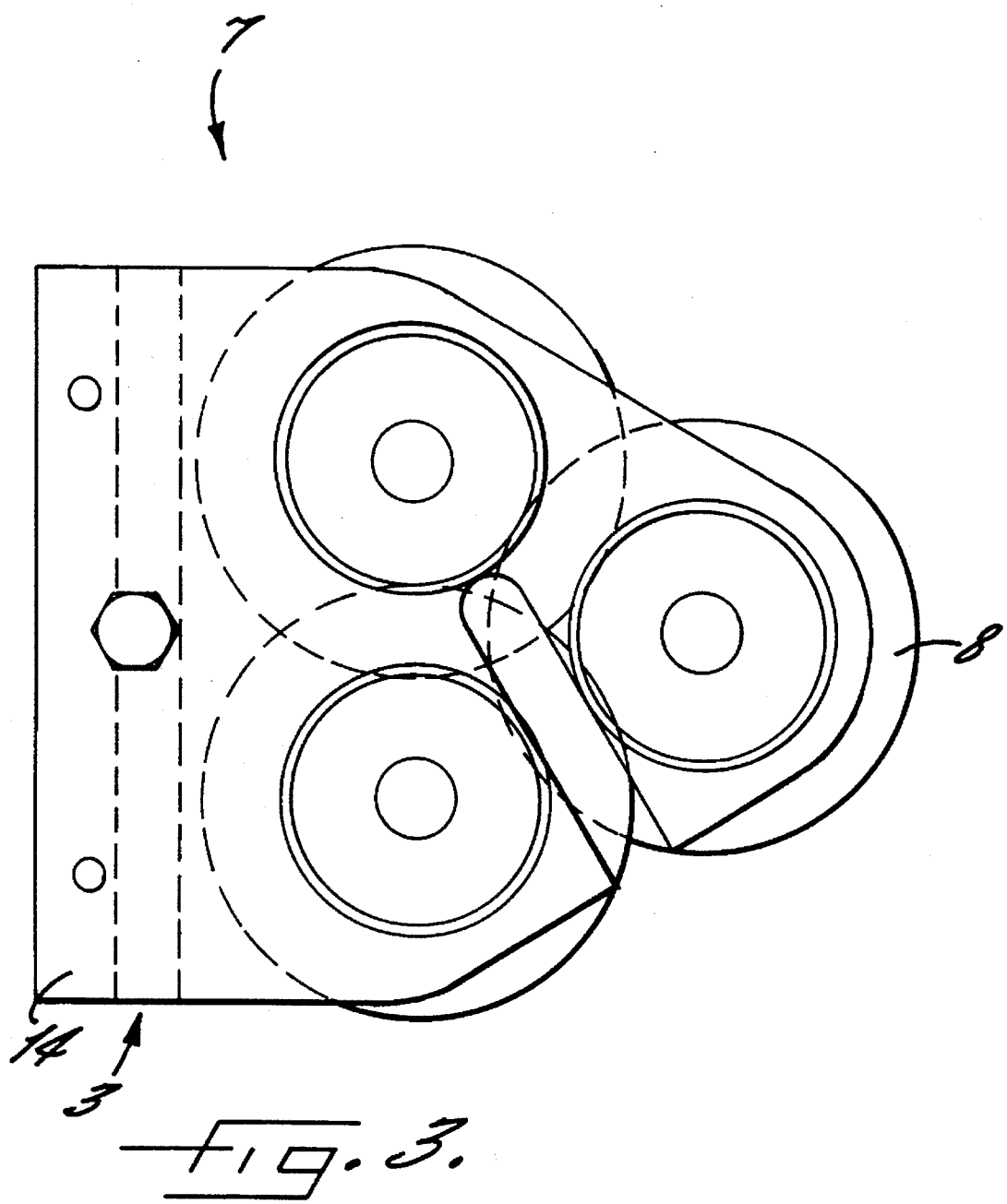
FIG. 3 is an axial top view of a friction false twist unit with three friction element shafts.
Figure 2:
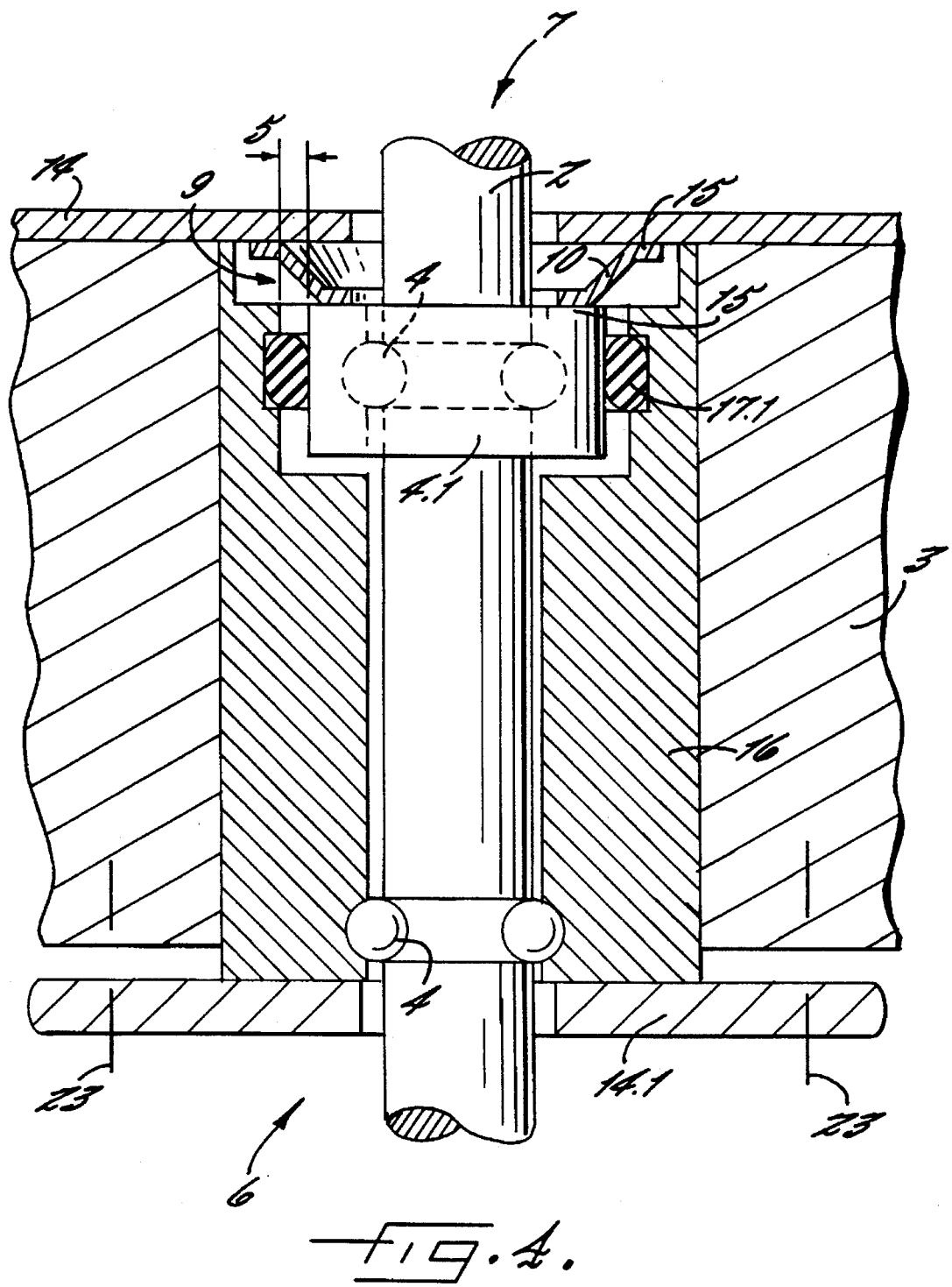

FIG. 3 is an axial top view of a friction false twist unit 1 for crimping synthetic fibers. In this illustration, the friction false twist unit comprises three vertically standing friction element shafts 2, which are arranged in the axial top view of FIG. 3 in the form of an equilateral triangle such that friction elements 8, which are in the present embodiment constructed as friction disks, overlap in the center of the triangle. In this respect, reference may be made to the entire contents of DE-OS 29 36 791 and DE-OS 29 36 845.

As is further shown in FIGS. 1, 1a, 2, 2a–b, and 4, the friction element shafts 2 are supported relative to a stationary mounting support 3, also described as housing 3, for rotation in antifriction bearings 4. In the case of the embodiments of FIGS. 1, 1a, 2, 2b, and 4, the stationary housing 3 is closed at its front ends by a pressure plate 14 and a counterpressure plate 14.1.

Each of bearings 4 consists of a peripheral groove or track not described in more detail, which rotates along with friction element shaft 2 and a nonrotating bearing part 4.1 generally termed as outer ring or race 4.1.

Outer ring 4.1 is rotationally immobile with respect to the housing. The outer rings 4.1 at free shaft end 7 exhibit with respect to housing 3 a radial play 5, which is dimensioned such that friction element shaft 2 is able to perform a movement caused by unbalance, without contacting housing 3. With respect thereto, reference is made to the entire contents of the aforesaid prior art.

This unbalance-generated movement of outer rings 4.1 can be damped in a manner known per se, in that the outer rings are arranged within the radial play in radial rubber dampers 17.1 and 17.2 which again are supported on housing 3.

However, it should be stated explicitly that this does not represent a limitation of the invention, but that the invention can also be realized without these radial rubber dampers 17.1 and 17.2 respectively.

Common to all embodiments is that one end of the rotating shafts is fixed with respect to housing 3, for example, end 6 in FIG. 4, and that the opposite end is freely movable within radial play 5.

Figure 1:
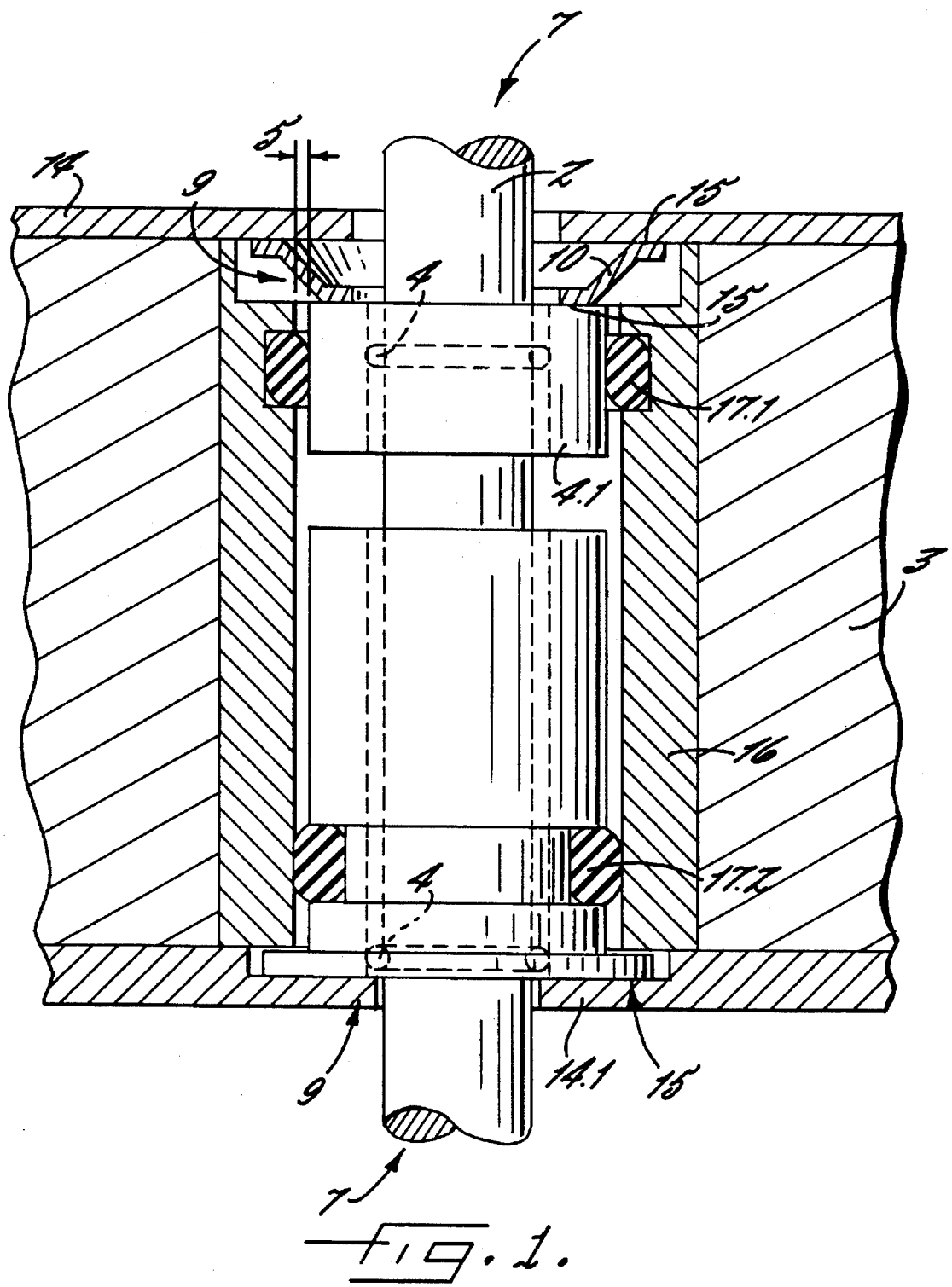
FIG. 1 illustrates a first embodiment of the present invention which employs a single friction element shaft with a fixed shaft end.

A special characteristic exists in FIG. 1.

Although, here, both shaft ends are shown movable (=free shaft end 7), same applies only to the instance of the initial startup of the friction false twist unit. At this occasion, the rotating shaft centers itself within housing 3 in its self-centered position, a radial sliding of the lower shaft end being basically not excluded either.

However, as soon as the shaft has assumed this self-centered position, it freezes in this position and the then slight forces of unbalance will no longer suffice to break away the lower shaft end from such position again.

In this condition the lower shaft end acts statically, i.e., in the fashion of a fixed shaft end.

The secured shaft end 6 is positioned relative to housing 3 radially immovably in lower bearing 4.

As further shown in FIGS. 1, 1a, 2, 2a–b, and 4, arranged between outer rings 4.1 and housing 3 or pressure plates 14 or 14.1 are friction dampers 9, which counteract the radial movement of friction element shafts 2 within radial play 5 by external friction forces.

These external friction forces are transmitted via paired friction elements 15 from the unbalance-generated vibrational movement of friction element shaft 2 to stationary mounting support 3. This action is done by static friction, the further function of which is described below in greater detail.

This effect is accomplished in that outer ring 4.1 of the loose bearing is acted upon by a friction damper 9, which is adjusted by axial external contact pressures against an end surface of the outer ring, and which damps the radial movement of shaft 2.

Figure 2:
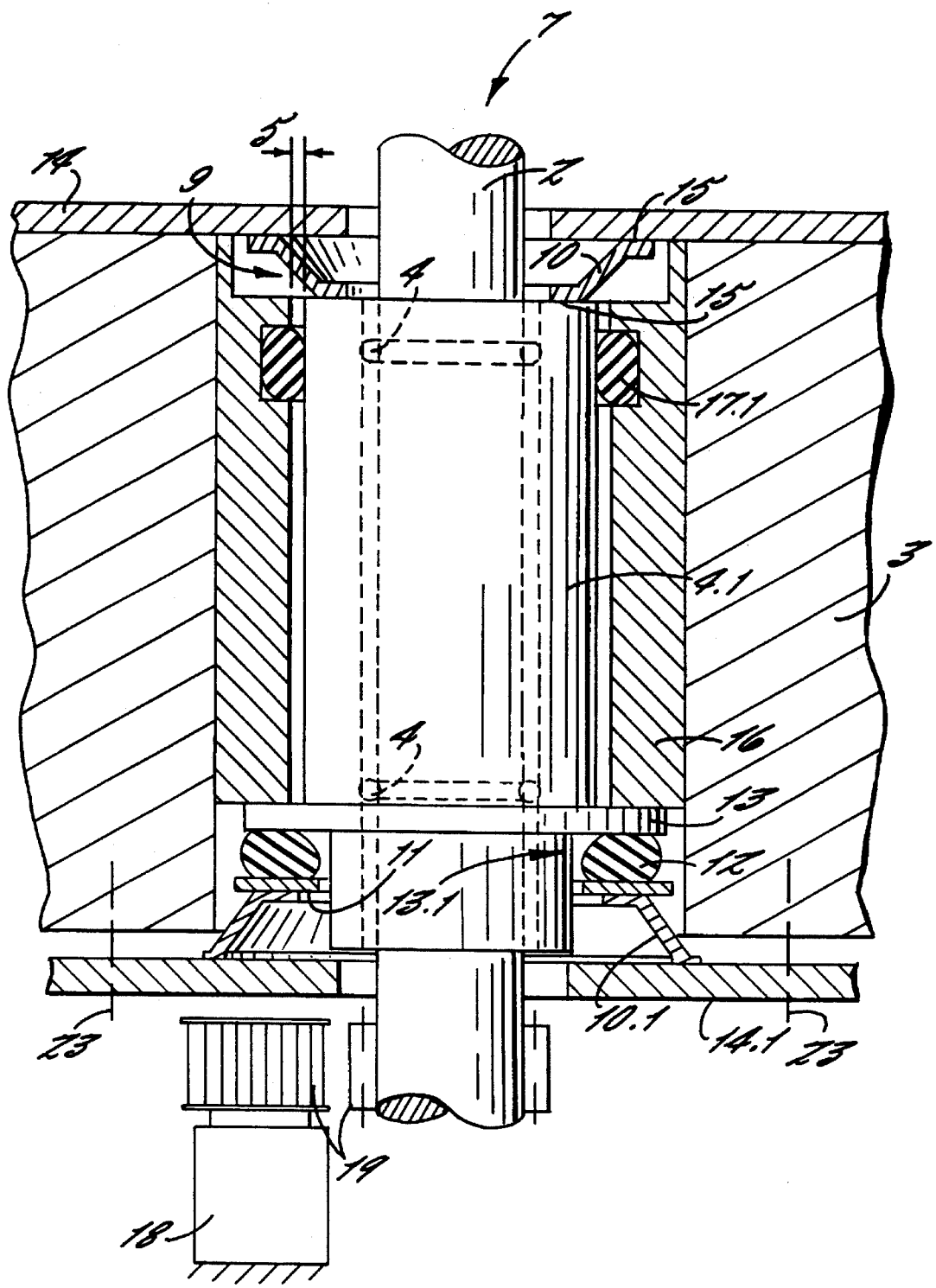
FIG. 2 illustrates a second embodiment of the present invention which employs a single friction element shaft.

Except the instance of the lower portion of FIG. 2, the friction dampers 9 consist exclusively of annular cup springs 10 which are peripherally supported between outer rings 4.1 and stationary mounting support (housing) 3 or pressure plates 14 or 14.1.

At this point however, it should explicitly be pointed out that this is not to limit the invention to cup springs.

It is possible to use all types of friction dampers which are arranged between outer rings 4.1 and stationary mounting support (housing) 3, and their use allows to transmit the unbalance-generated movement of the friction element shaft by external static friction forces to a friction damper and to thus damp same.

The use of cup springs 10 allows to accomplish in a very simple manner that outer rings 4.1 are secured in position relative to stationary mounting support 3, 14, 14.1 by friction dampers 9 under an axial biasing force such that the force of friction is dependent on the respective biasing force.

This offers the advantage that the amount of the damping force of friction can be predetermined by the selection of a cup spring 10 with a corresponding characteristic curve.

Thus, it is possible in the instance of small dimensions of installation to produce nonetheless high damping forces by selecting a correspondingly stiff cup spring, should need arise.

A possibility of firmly securing a shaft end in position is shown in the lower portion of FIG. 2.

There, a counterpressure cup spring 10.1 is supported between stationary counterpressure plate 14.1, an interposed axial ring 11, and a pressure ring 12 on a collar 13, which forms part of outer ring 4.1.

The annular pressure ring 12 which is an axially biased rubber element, is arranged and held in position on a stepped diameter 13.1 between axial ring 11 and collar In this instance, an axial biasing is applied by counterpressure cup spring 10.1 which pushes pressure ring 12 under axial stress from counterpressure plate 14.1, via centering sleeve 16, toward pressure plate 14.

In this instance, counterpressure cup spring 10.1 is stronger than cup spring 10, so as to produce high frictional forces necessary to retain the fixed bearing located at this shaft end, between pressure ring 12 and axial ring 11 or collar 13.

Furthermore, in this manner it is avoided with certainty that the centering sleeve rises from pressure plate 14.

Figure 2B:
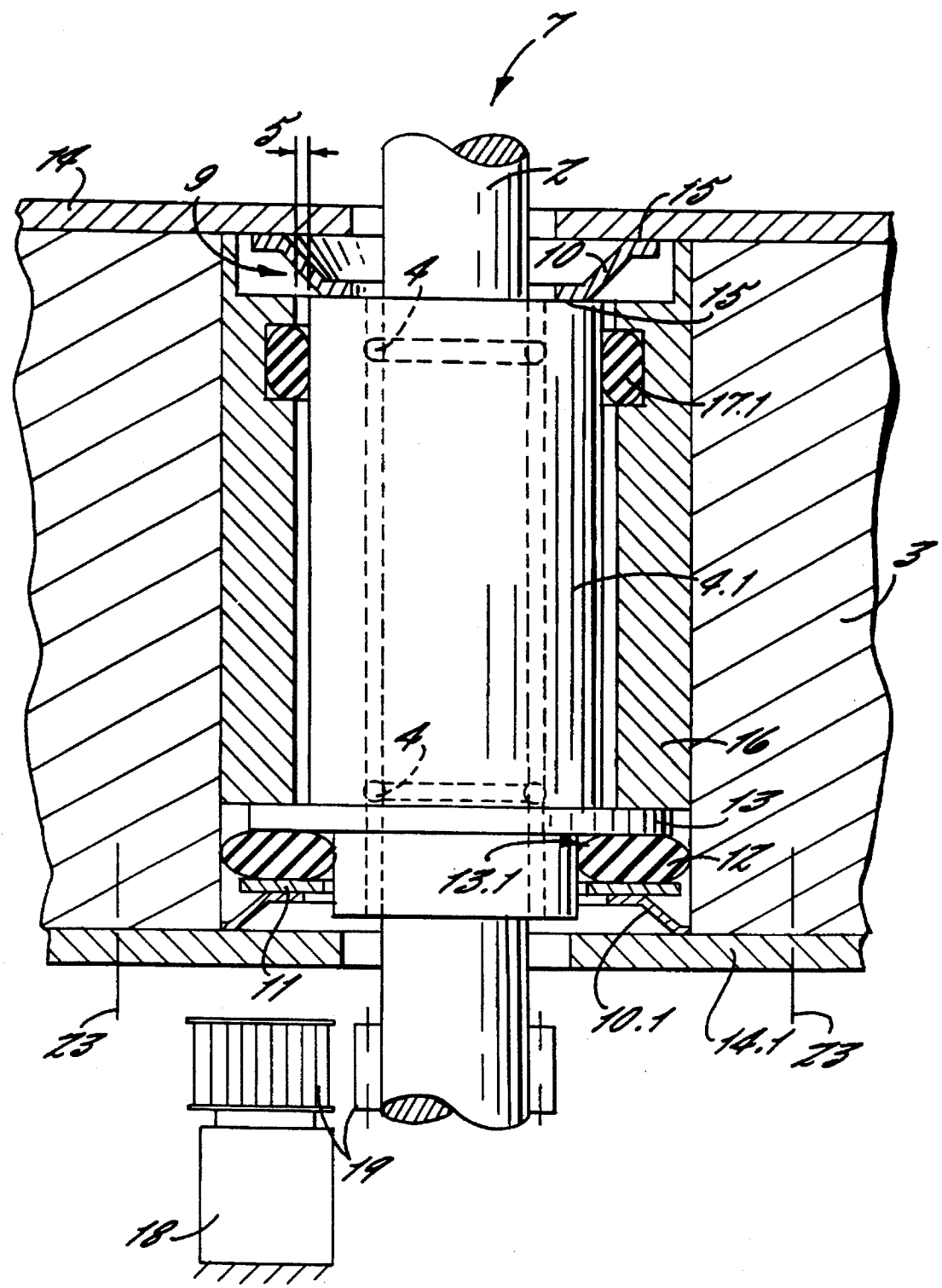
FIG. 2b shows a detail view of an alternative bearing of the embodiment of FIG. 2 at the fixed shaft end.

In a general sense, this also applies to the embodiment shown in FIG. 2b, however with the exception that a contact exists between counterpressure plate 14.1 and housing 3. Thus, a precisely defined installation position is obtained between counterpressure plate 14.1 and housing 3, the initial bias of counterpressure cup spring 10.1, as in the case of FIG. 2, being large enough so as to axially and radially secure the respective shaft end in the meaning of a fixed bearing.

Furthermore, in this embodiment pressure ring 12 assumes a centering function for the friction element shaft already during the assembly. To this end, counterpressure ring 12 is supported with its outer circumference on housing 3 and with its inner circumference on an extension of outer ring 4.1 of the bearing.

A further characteristic consists in that in this instance counterpressure cup spring 10.1 is perforce centered with its outside diameter in housing 3. To this end, the outside diameter of counterpressure cup spring 10.1 corresponds to the inside diameter of housing 3.

Applicable to all Figures is that the upper antifriction bearing and the lower antifriction bearing 4 are biased against one another in axial direction.

This biasing of the bearings serves the purpose of transmitting the shaft movement free of play to the outer rings of the bearings and the damping elements being active thereon. This free-of-play transmission is accomplished in that the damping action becomes fully effective already at the slightest deflections.

In the case of FIGS. 2 and 2b, the axial biasing of the bearings occurs via common outer ring 4.1, for example, by predetermined, slightly differing spacings of the ball tracks in the outer ring with respect to the ball tracks in the inner ring.

Another possibility of applying a bias between the bearings may occur in the instance of a common outer ring of the two antifriction bearings by inserting balls with a slightly oversized diameter.

In all embodiments, friction dampers 9 are operative substantially in the regions of the free ends 7 of friction elements shafts 2.

In the cases of FIGS. 1, 1a, 2a–b, and 4, the friction element shafts 2 are arranged in addition in annular, radial rubber dampers 17.1, 17.2 (or 12). The radial rubber dampers 17.1 serve as upper centering ring of friction element shafts 2, whereas radial rubber damper 17.2 (or 12) serves analogously as lower centering ring, so as to damp the shaft at the initial startup, before the latter assumes its self-centered position.

In all cases, a radial compression of radial rubber dampers 17.1 and 17.2 (or 12) occurs, when friction element shaft 2 performs, as it rotates, an unbalance-generated deflection from its illustrated central position.

As can be noted from FIG. 2, the friction element shafts 2 are set into rotation by a drive motor 18, which drives all friction element shafts 2 (see FIG. 3) via a toothed belt not shown, which is operative on toothed belt pulleys 19.

Figure 1A:
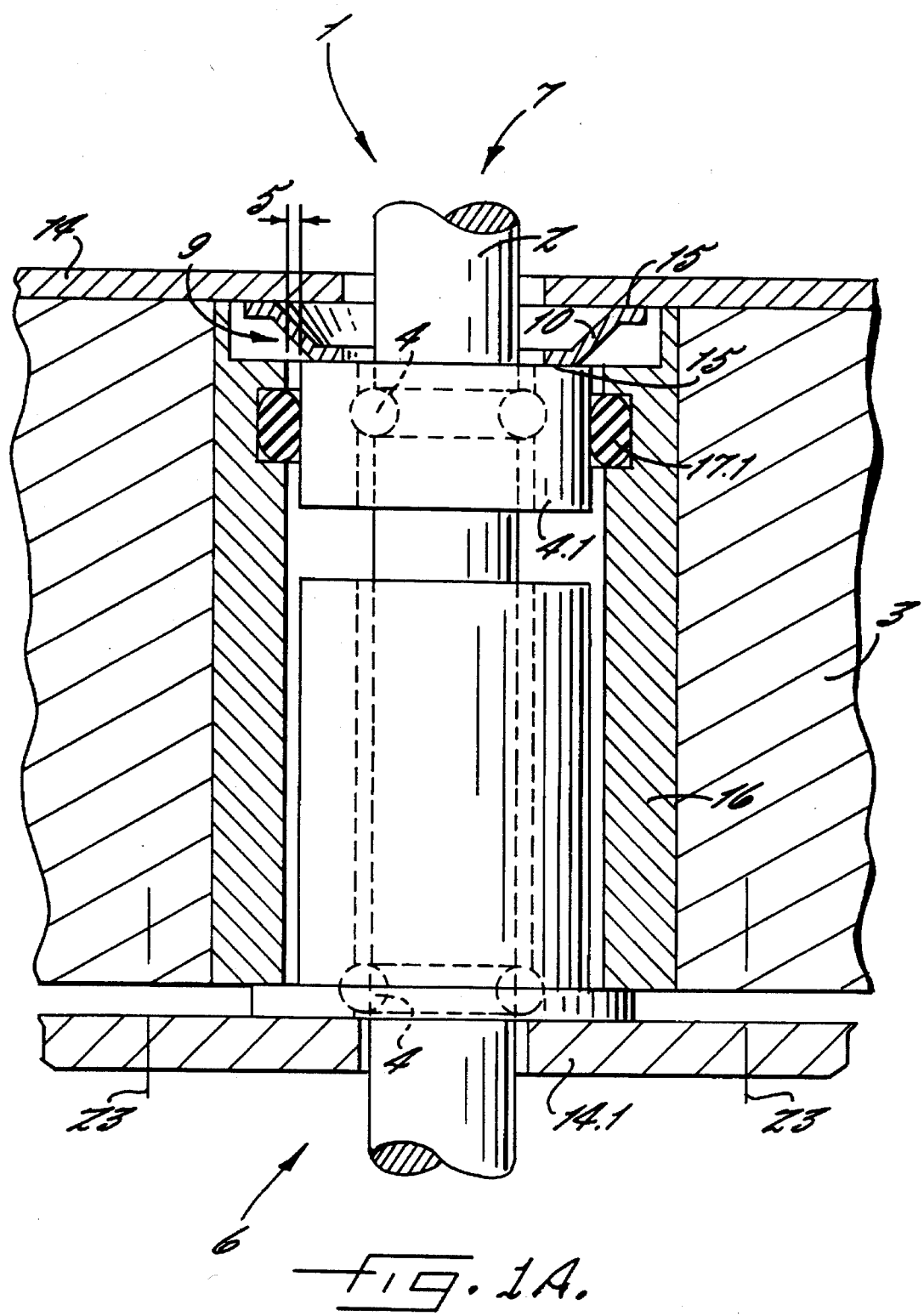
FIG. 1a illustrates a further development of the embodiment of FIG. 1 with a clamped shaft end.

FIG. 1a shows a characteristic of the invention. In this case, the outer ring of the lower bearing is secured from the beginning in radial direction. This is accomplished in that the outer ring is provided at its lower end with a collet, which clamps the outer ring between counterpressure plate 14.1 and the lower front end of centering sleeve 16. The centering sleeve 16 is supported with its upper end on pressure plate 14. Thus, it is located immovably between pressure plate 14 and counterpressure plate 14.1 as is the outer ring of the lower bearing. Of importance to this end is that counterpressure plate 14.1 can be clamped firmly against housing 3 by means of clamping screws 23. To this end, an air gap having the dimensions of the collet is provided between counterpressure plate 14.1 and the lower front end of housing 3.

The outer ring of upper antifriction bearing 4 is pressed downward by cup spring 10, the bias applied by the latter being so great that the entire shaft is secured in axial direction. In this instance, the cup spring thus assumes the double function of axially securing the shaft on the one hand and of damping the vibrations of the shaft on the other. Both functions are dependent on one another via the biasing force and the coefficient of friction.

FIG. 2a shows a further embodiment of axially securing the antifriction bearings.

The illustration of FIG. 2a can be a cutaway portion of FIG. 2. As regards all particulars not described in more detail, reference may be made to this Figure and its relevant description in their entirety.

Essential is that outer ring 4.1 of the upper ball bearing is accommodated in a bearing seat which is formed in the outer ring of the lower ball bearing. Initially, the outer ring of the upper ball bearing is arranged for sliding movement in the bearing seat, an axial biasing spring 26 being located between an annular offset of the bearing seat and the front end of the outer ring of the upper antifriction bearing facing the insert side. The outer ring 4.1 of the upper antifriction bearing is pressed into the bearing seat against the force of axial biasing spring 26, until the necessary biasing force is reached. In this position, outer ring 4.1 of the upper antifriction bearing is secured. To this end, it is provided on its outer circumference with an annular groove 25 which communicates with a bore 24. The latter extends through the outer ring of the lower bearing and terminates outside. To secure the outer ring of the upper bearing, after applying the axial bias, annular groove 25 is filled through bore 24 with an adhesive which secures the two bearings in an axially clamped position.

Operation:

In all embodiments, friction element shafts 2 are arranged relative to housing 3, 14, or 14.1 with radial play 5. As can be noted, the radial play 5 occurs only at the free shaft end.

As is known, such friction element shafts 2 rotate at speeds up to 25,000 revolutions per minute and greater. In so doing, rotating forces are caused by always present unbalances, which are contributory to a generation of vibrations of the entire arrangement.

The vibration of the arrangement is thus caused by periodically occurring forces of unbalance which can be counteracted by oppositely directed damping forces.

These damping forces are generated by friction dampers 9, since they are connected on the one hand with stationary mounting support 3 or 14 or 14.1 and on the other hand with periodically moved outer rings 4.1 of the loose bearings. Thus, at the points of contact between the friction dampers and the surfaces moved relative thereto a friction force occurs, the amount of which is dependent on the amount of the force of contact on the friction surface and paired friction elements 15. Suitably, the amount of the contact force is to be selected such that upon exceeding a predetermined maximum force, the paired friction element breaks away and a condition of sliding friction is reached, so that the rotating shaft is able to center itself.

Thereafter, the friction dampers operate statically, i.e., a renewed breakaway will no longer occur under normal conditions.

Furthermore, the friction dampers of the present invention allow to obtain a damping effect also during the acceleration of the friction unit, when the latter is brought from standstill to its operating speed and, in so doing, has to pass through the particularly dangerous natural resonant frequencies of the lower critical speeds.

After the friction element shaft has passed through its critical speed, occurring vibrational deflections fade away and thus also the movements of the outer ring. In the final condition, with appropriately selected paired friction surfaces, the friction damper will assume a static condition, since in this instance the shaft rotates self-centered.

Figure 5:
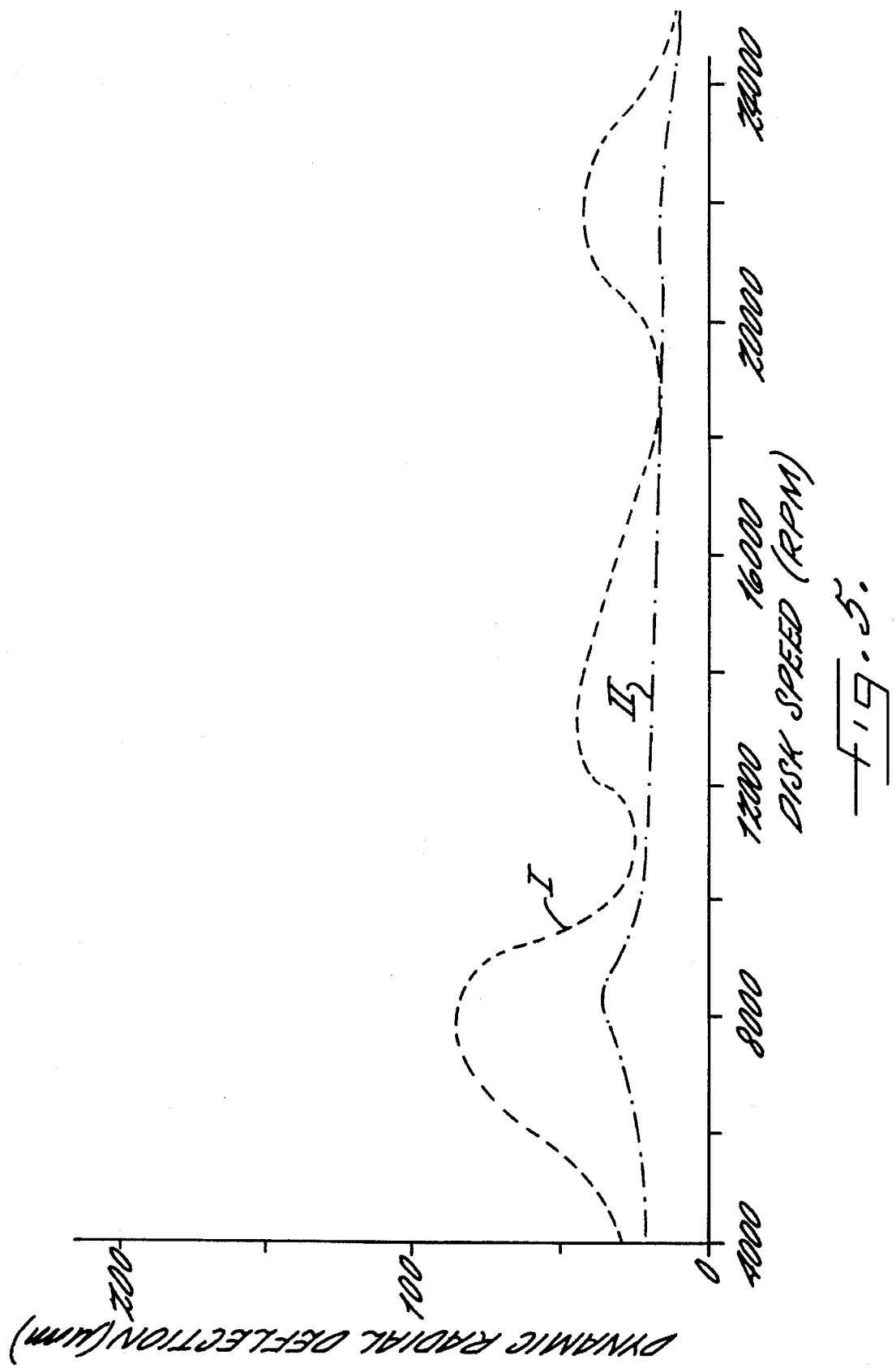
FIG. 5 is a diagram illustrating the radial deflections as a function of the rotational speed.

Shown in FIG. 5 is a diagram, in which the dynamic radial deflections of a friction element shaft in accordance with the invention are plotted qualitatively as a function of the disk speed. In this diagram, the course of curve I corresponds to a qualitative course, as can be obtained with a standard flexible bearing of the friction element shaft. This course is illustrated, so as to be able to show the effect of the present invention with reference to the course of curve II. The latter has as a whole a flatter slope, with lesser deflections as a whole (approximately up to two thirds less), as can be obtained with a bearing of the present invention.

As the speed increases, in both cases the deflections start to increase and reach at about 8,000 rpm their maximum, which is however in case II by about two thirds less than in case I.

Accordingly, in the range of this speed, the first critical speed of the friction element shaft is reached, at which unbalance-generated radial deflections would assume dangerously high values, were they not counteracted by the friction dampers of the present invention.

Thereafter, in case of curve I two further maxima occur in the range of 13,000 rpm and 22,000 rpm, to which the foregoing applies accordingly, whereas in case of curve II, after passing the first critical speed, the radial deflections decrease continuously until the desired speed of the friction element shaft of about 24,000 rpm is reached.

Furthermore, it is striking that in case of curve I three critical ranges of speeds are passed, whereas with the bearing of case of curve II only a single range of critical speed occurs.

As is further shown in FIGS. 1, 1a, 2, 2a–b, and 4, the cup springs 10 are arranged in a centered position with respect to the axis center. In this instance, the edges of cup springs 10 form a spacing at a constant annular width over the circumference both with respect to the friction element shaft and with respect to centering sleeve 16.

For certain cases of applications it may moreover be advantageous to forcibly center the cup springs 10 at least with one end.

Figure 6A:
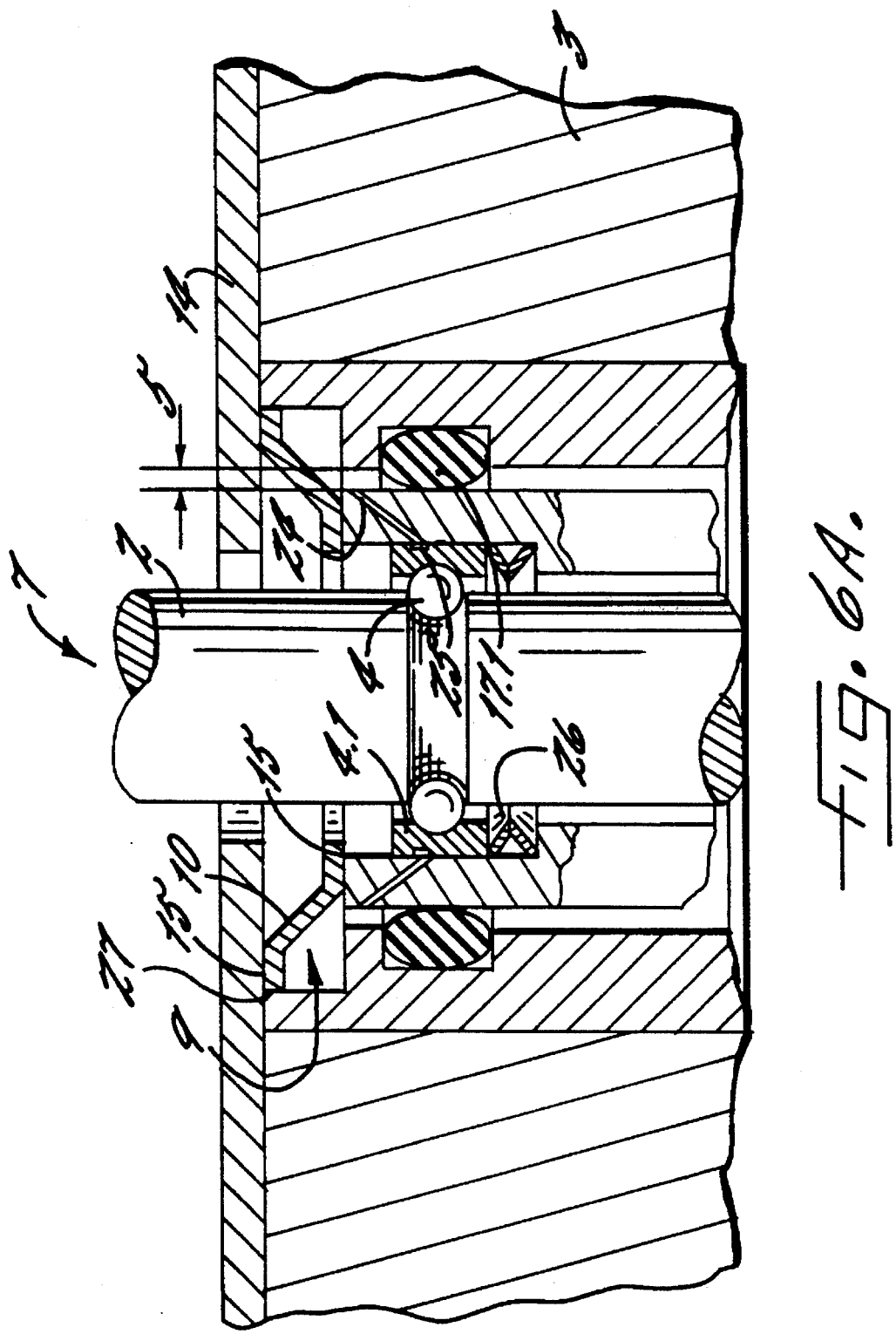
FIGS. 6a and 6b show each an embodiment of the present invention in accordance with FIGS. 1–4 with perforce centered cup springs.
Figure 6B:
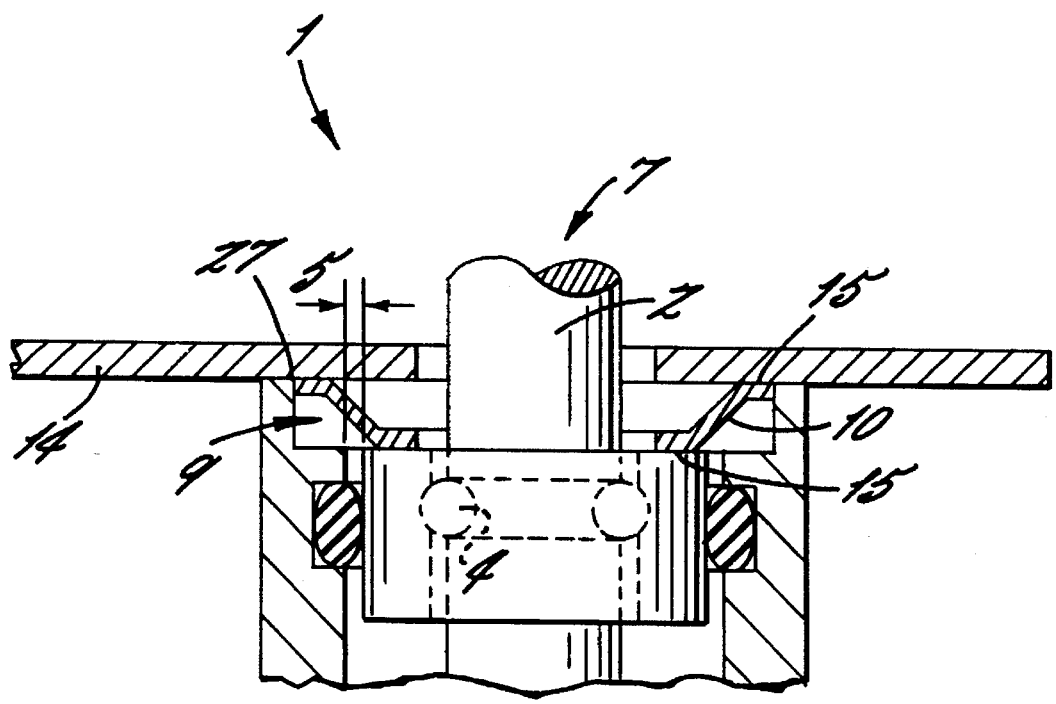

To this end, FIGS. 6a–b show that the cup springs are arranged relative to housing 3 inside a centering ring 27, the inside diameter of which corresponds exactly with the outside diameter of the cup spring.

I claim:

1. An apparatus for friction false twisting an advancing yarn and comprising
   a mounting bedplate, said bedplate including a pressure plate and a counter pressure plate which are axially spaced apart and parallel to each other,
   a yarn twisting assembly comprising at least three spindles, and means mounting said spindles to said bedplate for rotation about fixed, parallel axes which are positioned at the corner points of an equilateral polygon having a number of sides corresponding to the number of spindles, and a plurality of circular disks mounted on each spindle for rotation therewith, and with the disks of the spindles overlapping at a point centrally between said spindles and defining an operative yarn path of travel extending axially therebetween, and means for concurrently rotating each of said spindles,
   said mounting means including for each of said spindles a bore in said bedplate, at least two bearings mounted in said bore in an axially spaced apart arrangement between said bore and the associated spindle, with the one of said bearings located nearest the circular disks of the associated spindle including a non-rotating outer ring which includes a contact surface which is perpendicular to the axis of the associated spindle and faces the circular disks of the associated spindle, and an outer peripheral surface which is coaxial with the axis of the associated spindle, and the other of said at least two bearings including a non-rotating outer ring which is clamped between said pressure plate and said counter pressure plate of said bedplate,
   a resilient radial damping ring disposed circumferentially between said outer peripheral surface of said outer ring of said one bearing and the outer ring of said other bearing, and
   friction damping means mounted to said bedplate so as to frictionally engage said contact surface of said outer ring of said one bearing and bias the same toward said other bearing and to thereby dampen radial movement of the spindle during operation of said apparatus.

2. The apparatus as defined in claim 1 wherein said friction damping means comprises an annular cup spring which is positioned between said contact surface and one of said pressure plates of said bedplate.

3. The apparatus as defined in claim 1 wherein said outer ring of said other bearing includes an annular bearing seat which receives the outer ring of said one bearing therein.

4. The apparatus as defined in claim 3 wherein said friction damping means comprises an annular cup spring which is positioned between said contact surface and one of said pressure plates.

5. The apparatus as defined in claim 4 wherein said resilient radial damping ring is disposed between said outer peripheral surface of said outer ring of said one bearing and said bearing seat of said outer ring of said other bearing.

* * * * *